(12) United States Patent
La Rosa et al.

(10) Patent No.: US 11,632,029 B2
(45) Date of Patent: Apr. 18, 2023

(54) ENERGY HARVESTER AND CORRESPONDING DEVICE

(71) Applicant: STMicroelectronics S.r.l., Agrate Brianza (IT)

(72) Inventors: Roberto La Rosa, Viagrande (IT); Salvatore Baglio, S. Giovanni la Punta (IT); Carlo Trigona, Syracuse (IT)

(73) Assignee: STMicroelectronics S.r.l., Agrate Brianza (IT)

(*) Notice: Subject to any disclaimer, the term of this patent is extended or adjusted under 35 U.S.C. 154(b) by 548 days.

(21) Appl. No.: 16/802,741

(22) Filed: Feb. 27, 2020

(65) Prior Publication Data
US 2020/0287453 A1    Sep. 10, 2020

(30) Foreign Application Priority Data
Mar. 4, 2019 (IT) .................. 102019000003099

(51) Int. Cl.
*H02K 35/02* (2006.01)
*G10K 9/122* (2006.01)
(Continued)

(52) U.S. Cl.
CPC ............ *H02K 35/02* (2013.01); *G10K 9/122* (2013.01); *G10K 9/16* (2013.01); *H02K 1/34* (2013.01); *H02N 2/181* (2013.01); *H02N 2/186* (2013.01)

(58) Field of Classification Search
CPC .......... H02K 35/02; H02K 1/34; G10K 9/122; G10K 9/16; H02N 2/181; H01N 2/186
(Continued)

(56) References Cited

U.S. PATENT DOCUMENTS

| | | | | |
|---|---|---|---|---|
| 2003/0185000 A1* | 10/2003 | Mah | ............ | H02K 35/02 362/192 |
| 2007/0030671 A1* | 2/2007 | Long | ............ | F21L 13/06 362/157 |

(Continued)

FOREIGN PATENT DOCUMENTS

EP    2882092 A1    6/2015

OTHER PUBLICATIONS

Haroun, et al., "Investigation of kinetic energy harvesting from human body motion activities using free/impact based micro electromagnetic generator", Journal of Diabetes and Cholesterol Metabolism, vol. 1(1), 2016.

(Continued)

*Primary Examiner* — Kerri L McNally
(74) *Attorney, Agent, or Firm* — Crowe & Dunlevy

(57) ABSTRACT

An energy harvester includes an elongated tubular casing extending around a longitudinal axis between opposed first and second ends. A body is arranged in the casing. A helical electrical winding is wound around the longitudinal axis. The body is arranged to move along the longitudinal axis with alternate motion away from the first end towards the second end and away from the second end towards the first end. As a result of this alternate motion, an electromotive force is produced in the at least one helical electrical winding. Furthermore, at least one of the first and second ends includes a piezoelectric transducer that is configured to co-operate in a kinetic energy transfer relationship with the at least one body to generate an electric voltage as a result of the at least one body reaching, in the alternate motion, an end-of-travel position towards the piezoelectric transducer.

28 Claims, 2 Drawing Sheets

(51) Int. Cl.
*G10K 9/16* (2006.01)
*H02K 1/34* (2006.01)
*H02N 2/18* (2006.01)

(58) Field of Classification Search
USPC .......................................................... 310/339
See application file for complete search history.

(56) References Cited

U.S. PATENT DOCUMENTS

| | | | | |
|---|---|---|---|---|
| 2008/0074083 | A1* | 3/2008 | Yarger | H02J 7/32 |
| | | | | 320/137 |
| 2009/0171404 | A1* | 7/2009 | Irani | A61N 1/056 |
| | | | | 290/1 R |
| 2009/0200983 | A1* | 8/2009 | Dyer | H02K 7/1876 |
| | | | | 320/107 |
| 2010/0253088 | A1* | 10/2010 | Weinberger | B60L 50/40 |
| | | | | 290/1 C |
| 2012/0104877 | A1* | 5/2012 | Isaacs | H02K 35/02 |
| | | | | 310/30 |
| 2012/0299299 | A1* | 11/2012 | Chan | H02K 35/02 |
| | | | | 290/50 |
| 2013/0300220 | A1* | 11/2013 | Weiss | H02K 7/1876 |
| | | | | 310/30 |
| 2019/0181738 | A1* | 6/2019 | Hsu | F03G 7/08 |

OTHER PUBLICATIONS

Naifar, et al. "A smart energy harvester for axial-force measurements in vibrating environments", 2018 IEEE Sensors Applications Symposium, Mar. 2018.

Olaru, et al., "Analysis and design of a vibration energy harvester using permanent magnets", Revue Roumaine de Sciences Techniques, vol. 59(2), 2014.

Soares Dos Santos, et al., "Magnetic levitation-based electromagnetic energy harvesting: a semi-analytical non-linear model for energy transduction", Scientific Reports 6, 2016.

Zhou, et al., "Nonlinear hybrid piezoelectric and electromagnetic energy harvesting driven by colored excitation", Energies, vol. 11(3), 2018.

IT Search Report and Written Opinion for IT Appl. No. 102019000003099 dated Jul. 19, 2019 (7 pages).

* cited by examiner

ENERGY HARVESTER AND CORRESPONDING DEVICE

PRIORITY CLAIM

This application claims the priority benefit of Italian Application for Patent No. 102019000003099, filed on Mar. 4, 2019, the content of which is hereby incorporated by reference in its entirety to the maximum extent allowable by law.

TECHNICAL FIELD

The description relates to energy harvesters. In particular, one or more embodiments may relate to kinetic energy harvesting, for example, from vibrations.

One or more embodiments may find use in a variety of applications, for example, battery-less systems such as wireless sensor networks (WSNs).

BACKGROUND

In energy harvesting (or, according to other designations, power harvesting or energy scavenging), energy from sources such as, for example, solar panels, wind generators, thermal generators of various types is stored for possible use in devices such as wireless portable devices or wireless sensors (for example, in wireless sensor network applications).

Nowadays, more and more emerging applications may be facilitated by the availability of battery-less systems based on different harvesting approaches (such as photovoltaic, piezoelectric, electromagnetic, etc.), with the purpose of implementing low-cost systems with highly integrated wireless platforms. Furthermore, battery-less systems may facilitate developments in all those scenarios where periodic battery replacement in nodes may be impractical, for example, because of either a large number of nodes or inaccessible node placement (for example, implanted medical devices, smart concrete systems, or in general devices located in hazardous or hard-to-reach environments). A growing demand thus exists for improved energy harvesting devices (energy harvesters).

A field of increasing interest for wireless sensor networks is represented by the so-called "Industry 4.0", wherein the ability to harvest energy and collect information from mechanical vibrations (for example, from an engine, a piece of industrial machinery, etc.) may be desirable.

Despite the extensive activity in the area, further improved solutions are desirable.

For instance, solutions are desirable for providing (miniaturized) vibration sensors with kinetic energy harvesting capabilities, for example, for realizing battery-free and so-called "set-and-forget" sensor nodes. Set-and-forget sensor nodes may be inherently (almost) maintenance-free, thereby facilitating IoT (Internet-of-Things) devices being virtually ubiquitous.

Specifically, solutions are desirable wherein a kinetic energy harvester may provide at the same time power supply functionality and vibrations measurement functionality of a vibration sensor. Such vibration sensor may thus be wireless and battery-free.

Solutions are desirable for providing kinetic energy harvesters with increased durability.

Solutions are desirable for providing energy harvesters with reduced dimensions (for example, highly miniaturized) and improved power harvesting capabilities, for example, improved power-to-volume ratio.

There is a need in the art to contribute in providing such improved solutions.

SUMMARY

According to one or more embodiments, an energy harvester is provided.

One or more embodiments may relate to a corresponding device, such as an "intelligent" energy harvester operating as a sensor for measuring an amount of vibrations in the environment where the energy harvester is placed.

One or more embodiments may relate to a "hybrid" kinetic energy harvester involving both piezoelectric and electromagnetic transducers for improved power-to-volume ratio.

BRIEF DESCRIPTION OF THE DRAWINGS

One or more embodiments will now be described, by way of example only, with reference to the annexed figures, wherein.

DETAILED DESCRIPTION

Figure 1:
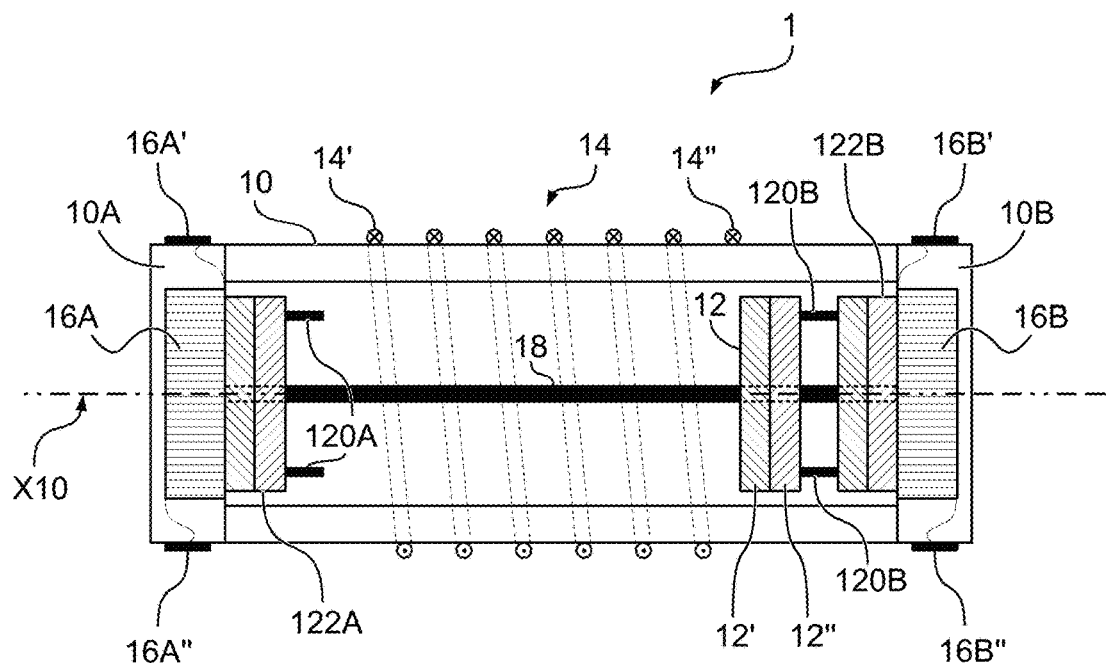
FIG. 1 is a cross section view exemplary of an energy harvester according to one or more embodiments.

It will be appreciated that, for clarity and simplicity of illustration, the various Figures may not be drawn to scale and may not be drawn all drawn to the same scale, and may moreover refer to different embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

In various industrial applications, sensing vibrations (for example, in an engine, a piece of industrial machinery, or the like) may be desirable to detect issues such as, for instance, loosening of a mechanical coupling between two parts of an engine or a piece of industrial machinery.

Installing a vibration sensor, for example, on the head of a screw, on a dowel, on a rivet, on a tie-rod or on a different kind of damper may facilitate detecting such issues related to vibrations. Additionally, vibration sensors may advantageously be provided with kinetic energy harvesting capabilities, so to provide battery-free operation.

In this context, the following documents, the disclosures of which are incorporated by reference, are exemplary of some approaches to the problem of kinetic energy harvesting:

S. Naifar et al., "A Smart Energy Harvester for Axial-Force Measurements in Vibrating Environments", 2018 IEEE Sensors Applications Symposium (SAS), 12-14 Mar. 2018, doi: 10.1109/SAS.2018.8336726;

A. Haroun et al., "Investigation of Kinetic Energy Harvesting from Human Body Motion Activities using Free/Impact Based Micro Electromagnetic Generator", Journal of Diabetes and Cholesterol Metabolism (DCM), 2016, Vol. 1(1), pp. 12-16;

R. Olaru et al., "Analysis and Design of a Vibration Energy Harvester using Permanent Magnets", Revue Roumaine des Sciences Techniques—Serie Électrotechnique et Énergétique, April 2014, Vol. 59(2), pp. 131-140;

M. P. Soares dos Santos et al., "Magnetic Levitation-based Electromagnetic Energy Harvesting: a Semi-Analytical non-linear Model for Energy Transduction", Scientific Reports 6, 2016, Article number: 18579, doi: 10.1038/srep18579 (2016); and X. Zhou et al., "Nonlinear Hybrid Piezoelectric and Electromagnetic Energy Harvesting Driven by Colored Excitation", Energies, February 2018, Vol. 11(3), doi: 10.3390/en11030498.

The inventors have noted that such prior approaches have several drawbacks.

For instance, the device proposed by S. Naifar et al. may be subject to progressive wear of the coil, which is a mobile part of the device, and of the mechanical spring, which in the long run may not return to its initial state of rest.

The devices proposed by R. Olaru et al. and M. P. Soares dos Santos et al. are not hybrid, resulting in a low efficiency in terms of power-to-volume ratio.

The main drawbacks of the device proposed by X. Zhou et al. are reduced efficiency due to a damping effect exerted by a locked cantilever over a moving magnet, and bulkiness of the device.

Figure 2:
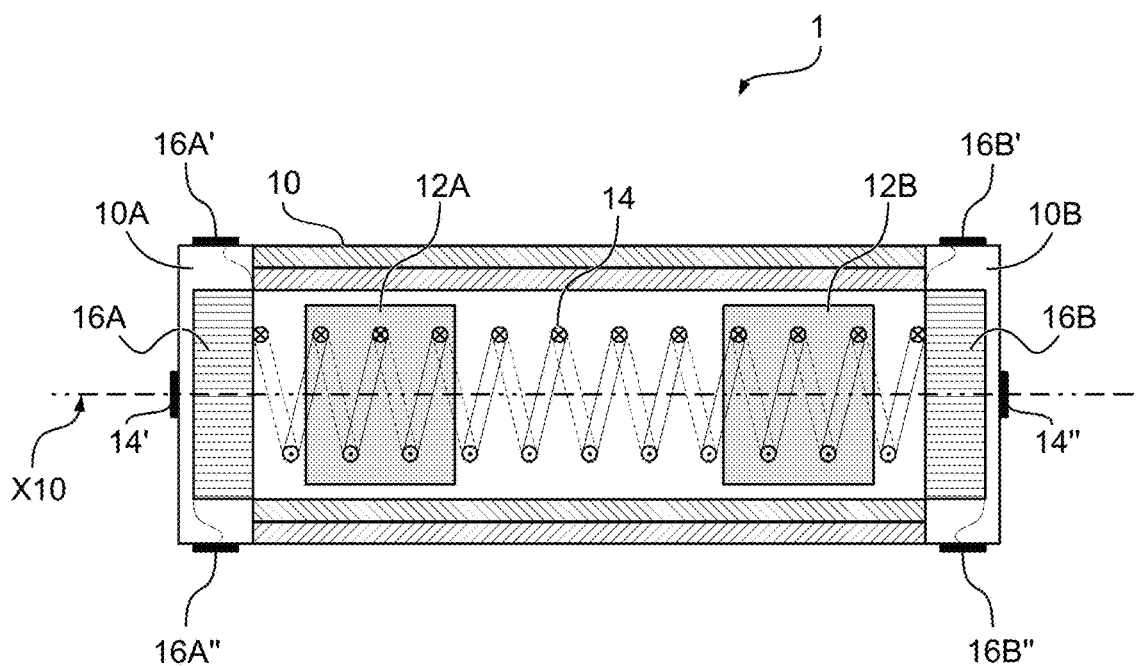
FIG. 2 is a cross section view exemplary of another energy harvester according to one or more embodiments.

FIGS. 1 and 2 are cross section views exemplary of different embodiments of an energy harvester 1 which aims to overcome one or more of the above-mentioned drawbacks.

As exemplified in FIGS. 1 and 2, an energy harvester 1 may comprise an elongated tubular casing 10 extending around a longitudinal axis X10 between opposed first and second ends 10A, 10B of the casing 10, at least one body 12, 12A, 12B (for example, at least one mass) arranged in the casing 10, and at least one helical electrical winding 14 wound around the longitudinal axis X10 of the casing 10.

The casing 10 may have the shape of a right prism having whatever number of sides (for example, a triangular prism, a square prism, a hexagonal prism, and so on) is desired. Preferably, the casing 10 has a cylindrical shape, with the opposed first and second ends 10A, 10B being circles.

Also the at least one body 12, 12A, 12B may have the shape of a right prism, preferably corresponding to the shape of the casing 10 (i.e., triangular if the casing is triangular, square if the casing is square, circular if the casing is cylindrical, and so on).

Despite being a preferred feature, correspondence between the shape of the casing 10 and of the at least one body 12, 12A, 12B is not mandatory, as long as the at least one body has a shape which allows it to move by inertia (for example, under the action of external forces acting on the energy harvester 1) in the elongated tubular casing 10 along a longitudinal direction thereof.

For instance, co-operation of a casing 10 having a cylindrical shape and a circular body 12, 12A, 12B may facilitate reducing friction due to motion of the body 12, 12A, 12B within the casing 10.

The at least one body 12 (as exemplified in FIG. 1) or 12A, 12B (as exemplified in FIG. 2) may comprise a right prism having a height (i.e., a dimension in the longitudinal direction defined by axis X10) smaller than its width (i.e., the dimension in a direction transverse to the axis X10), therefore resembling a sort of disk. However, such a ratio between the height and width of the body is purely exemplary, and in variant embodiments the height of the body may be equal to or higher than the width thereof.

As exemplified in FIGS. 1 and 2, the electrical winding 14 may have a first terminal 14' and a second terminal 14" for electrical coupling, for example, to circuitry external to the energy harvester 1.

The at least one body 12, 12A, 12B may be arranged in the casing 10 movable along the longitudinal axis X10 between the first end 10A and the second end 10B of the casing. Thus, the at least one body may be movable in the way of alternate motion away from the first end 10A towards the second end 10B of the casing 10, and vice-versa.

As exemplified in FIGS. 1 and 2, the first end 10A and the second end 10B of the casing 10 may comprise respective piezoelectric transducers 16A, 16B. Alternatively, in one or more embodiments, only one of the first end 10A and the second end 10B may comprise a respective piezoelectric transducer.

Each of the piezoelectric transducers 16A, 16B may comprise a respective pair of terminals 16A', 16A" and 16B', 16B" for electrical coupling, for example, to circuitry external to the energy harvester 1.

In both embodiments exemplified in FIGS. 1 and 2, alternate motion of the at least one body 12 (or 12A, 12B) along the longitudinal axis X10 may result in a variation of the magnetic flux through the turns of the electrical winding 14, thereby producing an electromotive force across the electrical winding 14 which may be collected at terminals 14' and 14". Also, in both embodiments exemplified in FIGS. 1 and 2, at least one piezoelectric transducer 16A, 16B is configured to co-operate in a kinetic energy transfer relationship with the at least one body as a result of the at least one body reaching an end-of-travel position towards the piezoelectric transducer during motion, resulting in an electric voltage being produced at the piezoelectric transducer, which may be collected at terminals 16A' and 16A" (and/or 16B' and 16B").

One or more embodiments as exemplified in FIG. 1 may comprise a guide structure 18 configured for guiding motion of the body 12 along the longitudinal axis X10 of the casing 10.

For instance, the guide structure may comprise a pole 18 extending along axis X10 between the first end 10A and the second end 10B of the casing 10, with the body 12 being slidably coupled to the pole 18 (for example, by means of a through hole passing through the body 12 at the longitudinal axis X10).

Advantageously, the body 12 may have a dimension in a direction transverse to the longitudinal axis X10 which is smaller than the transverse inner dimension of the casing 10, i.e. the body 12 slidably guided by the pole 18 may not be in contact with the inner surface of the casing 10, thereby reducing friction which may hamper motion of the body 12 and may reduce the overall efficiency of the energy harvester 1.

It will be appreciated that such a guide structure 18 as exemplified with reference to an exemplary embodiment illustrated in FIG. 1 may be provided in an exemplary embodiment as illustrated in FIG. 2, for example, with a pole extending along axis X10 and passing through the bodies 12A, 12B.

One or more embodiments as exemplified in FIG. 1 may comprise bumper formations 120A, 120B (for example, acting as limit stop devices) protruding from the first and second ends 10A, 10B of the casing 10 towards the inner volume of the casing 10, for example, being interposed between the piezoelectric transducers 16A, 16B and the movable body 12.

Such bumper formations 120A, 120B may comprise, for instance, an annular body extending in the longitudinal direction of the casing 10, and may be configured to:
  prevent the body 12 from coming into abutment with the piezoelectric transducers 16A, 16B, and
  transferring at least partially the kinetic energy of the body 12 to the piezoelectric transducers 16A, 16B as a result of the body 12 impacting against the bumper formations 120A, 120B.

It will be appreciated that such bumper formations 120A, 120B as exemplified with reference to an exemplary embodiment illustrated in FIG. 1 may be provided also in an exemplary embodiment as illustrated in FIG. 2.

In one or more embodiments as exemplified in FIG. 1, the body 12 arranged in the casing 10 may comprise magnetized material (for example, a permanent magnet). Preferably, the magnetized material in the body 12 may provide a magnetic polarization of the body 12 which is substantially parallel to the longitudinal axis X10 of the casing 10. For instance, the body 12 may comprise a first portion 12' facing the first end 10A of the casing 10 and having a first magnetic polarity (for instance, north polarity) and a second portion 12" facing the second end 10B of the casing 10 and having a second magnetic polarity opposite to the first magnetic polarity (for instance, south polarity).

Additionally, in one or more embodiments as exemplified in FIG. 1, an energy harvester 1 may comprise further permanent magnets 122A, 122B arranged respectively at the first and second ends of the casing 10 (for example, interposed between each of the first and second ends 10A, 10B of the casing 10 and the respective bumper formations 120A, 120B).

In particular, the permanent magnets 122A, 122B may have respective magnetic polarizations which are oriented in a direction opposite to the magnetic polarization of the magnet in the body 12, so to exert a repulsive magnetic force on the movable body 12 and counter impact of the movable body 12 against the bumper formations 120A, 120B.

In one or more embodiments as exemplified in FIG. 1, the electrical winding 14 may be wound around the elongated tubular casing 10, i.e., at an outer surface thereof.

Alternatively, the electrical winding 14 may be wound at an inner surface of the casing 10, along the longitudinal direction of the axis X10.

Therefore, in one or more embodiments as exemplified in FIG. 1, motion of a magnetized body 12 in a longitudinal direction of the casing 10 may result in a variation of the magnetic flux through the turns of the helical electrical winding 14, which in turn may produce an electromotive force across the electrical winding 14 at the terminals 14' and 14". Thus, kinetic energy of the body 12 may be at least partially harvested using an electromagnetic coupling of magnetized body 12 and electrical winding 14.

Additionally, the piezoelectric transducers 16A, 16B located at the opposed ends 10A and 10B may be configured to co-operate in a kinetic energy transfer relationship with the body 12 as a result of the body 12 reaching a respective end-of-travel position in said alternate motion towards the first end, resp. the second end, of the elongated tubular casing 10.

In particular, in absence of the bumper formations 120A, 120B and in absence of the permanent magnets 122A, 122B, the body 12 may directly impact against the piezoelectric transducers 16A, 16B at the ends 10A, 10B, thereby producing an electric voltage at the piezoelectric transducers 16A, 16B at each impact. The end-of-travel positions of the body 12 may thus correspond to a condition of abutment against the piezoelectric transducers 16A, 16B.

In case bumper formations 120A, 120B are provided between the body 12 and the piezoelectric transducers 16A, 16B, the body 12 may impact against the bumper formations 120A, 120B which in turn may transfer at least partially the kinetic energy of the body 12 to the piezoelectric transducers 16A, 16B.

The bumper formations 120A, 120B may have a certain elasticity, for example due to their material or their shape. A lower, or alternatively higher, elasticity of the bumper formations may result in a higher, or alternatively lower, amount of kinetic energy being transferred from the body 12 to the piezoelectric transducers 16A, 16B. Thus, tuning the elasticity of the bumper formations 120A, 120B may provide the possibility of tuning the operation of the energy harvester 1, for example, in terms of ratio between the energy harvested by means of the piezoelectric transducers 16A, 16B and energy harvested by means of the electrical winding 14.

Additionally, in case permanent magnets 122A, 122B are provided in the energy harvester 1, also tuning the value of magnetization of such permanent magnets may provide the possibility of tuning a ratio between the energy harvested by means of the piezoelectric transducers 16A, 16B and energy harvested by means of the electrical winding 14.

In one or more embodiments as exemplified in FIG. 2, the elongated tubular casing 10 of an energy harvester 1 may comprise magnetic material for generating a magnetic field within the casing 10, preferably a non-uniform magnetic field.

In one or more embodiments as exemplified in FIG. 2, the helical electrical winding 14 comprises a helical spring of electrically-conductive material arranged in the casing between the first end 10A and the second end 10B, for example, having a first end in abutment with the first end 10A and a second end in abutment with the second end 10B. The helical spring 14 may have a first terminal 14' and a second terminal 14" for electrical coupling, for example, to circuitry external to the energy harvester 1.

The shape and/or dimension of the helical spring 14 may vary according to different embodiments. For instance, the helical spring 14 may have various width, length, distance between turns, shape of the turns, etc. Additionally or alternatively, the helical spring 14 may comprise a mix of spring elements and deformable spires and/or turns.

In one or more embodiments as exemplified in FIG. 2, at least one body (for example, two bodies 12A, 12B) adapted for moving due to inertial effects may be mechanically coupled (for example, attached, fixed) to the helical spring 14, for instance with a first body 12A coupled to the helical spring 14 in proximity to the first end 10A of the casing 10 and a second body 12B coupled to the helical spring 14 in proximity to the second end 10B of the casing 10.

Therefore, in one or more embodiments as exemplified in FIG. 2, motion of the bodies 12A, 12B along the longitudinal axis X10 may result in deformation of the helical spring 14 along the longitudinal axis X10 (for example, motion and/or deformation of at least one turn of the helical spring 14). In presence of a (non-uniform) magnetic field within the casing 10, deformation and/or movement of the electrical winding 14 may result in a variation of the magnetic flux therethrough, which in turn may result in an electromotive force being produced across the electrical winding 14 at the terminals 14' and 14". Thus, kinetic energy of the bodies 12A, 12B may be at least partially harvested using an electromagnetic transducer.

Additionally, the piezoelectric transducers 16A, 16B may be configured to co-operate in a kinetic energy transfer relationship with the bodies 12A, 12B, for example, collecting kinetic energy upon impacts of the bodies 12A, 12B against the piezoelectric transducers 16A, 16B. An elastic coefficient of the helical spring 14 may be chosen so that, in presence of vibrations of the energy harvester 1 along the longitudinal direction, the first body 12A impacts against the first piezoelectric transducer 16A and the second body 12B impacts against the second piezoelectric transducer 16B, alternatively, thereby providing means for harvesting kinetic energy of the bodies 12A, 12B via the piezoelectric transducers 16A, 16B.

Tuning the elastic coefficient of the helical spring 14 may provide the possibility of tuning the operation of the energy harvester 1, for example, in terms of ratio between the energy harvested by means of the piezoelectric transducers 16A, 16B and energy harvested by means of the electrical winding 14.

In one or more embodiments (not visible in the Figures annexed herein), a single body 12 may be mechanically coupled (for example, attached, fixed) to the helical spring 14, with such single body 12 possibly impacting against both the first piezoelectric transducer 16A (for example, at a first side of the body 12 facing the first end 10A of the casing) and the second piezoelectric transducer 16B (for example, at a second side of the body 12, opposite the first side of the body 12 and facing the second end 10B).

Figure 3:
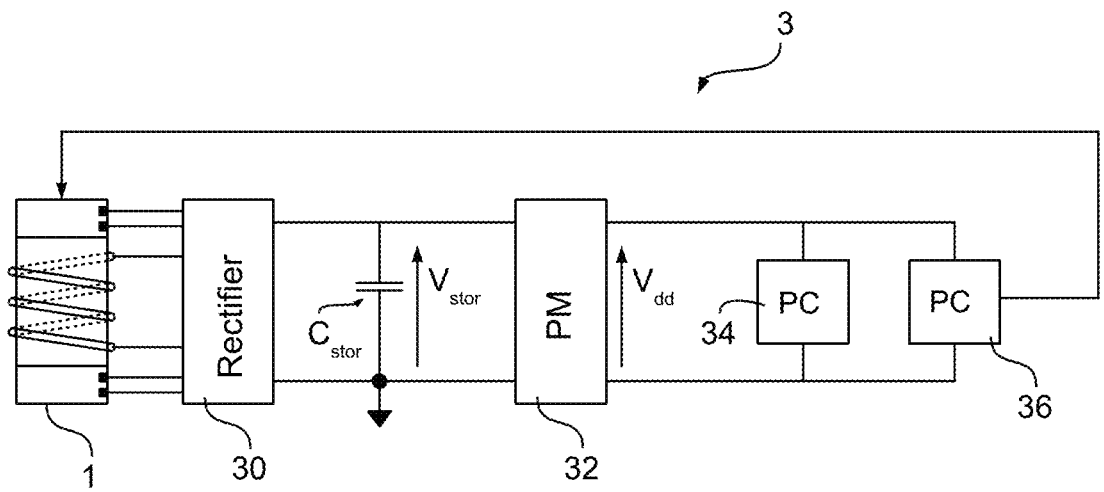
FIG. 3 is a circuit block diagram exemplary of a device according to one or more embodiments.

FIG. 3 is a circuit block diagram exemplary of a device 3 according to one or more embodiments and comprising an energy harvester 1 as exemplified in FIG. 1 or FIG. 2.

The device 3 may comprise a rectifier circuit 30 coupled to at least one electrical winding 14 and to at least one piezoelectric transducer 16A, 16B in the energy harvester 1. The rectifier circuit 30 may be configured for rectifying a voltage generated by the electrical winding 14 and a voltage generated by the at least one piezoelectric transducer 16A, 16B, thereby providing an output rectified voltage $V_{stor}$ to an energy storage component $C_{stor}$ such as a capacitor for storing energy therein.

In particular, the rectifier circuit 30 may comprise:
a first bridge rectifier arrangement (for example, a diode bridge) configured for coupling to terminals 14' and 14" of the electrical winding 14,
a second bridge rectifier arrangement configured for coupling to terminals 16A' and 16A" of the first piezoelectric transducer 16A, and
optionally, in case a second piezoelectric transducer 16B is comprised in the energy harvester 1, a third bridge rectifier arrangement configured for coupling to terminals 16B' and 16B".

The output ports of the first, second and third bridge rectifier arrangements may be, for instance, electrically coupled in series so to provide to the storage capacitor $C_{stor}$ a rectified voltage $V_{stor}$ equal to the sum of the rectified voltages produced by the electrical winding 14, the first piezoelectric transducer 16A and optionally the second piezoelectric transducer 16B.

The device 3 may comprise a power management (PM) circuit 32 configured to sense a voltage $V_{stor}$ across the storage capacitor $C_{stor}$ and to supply energy from the storage capacitor $C_{stor}$ to a load circuit such as processing circuitry 34, 36 coupled at the output of the power management circuit 32 by providing a supply voltage $V_{dd}$ thereto.

Preferably, as a result of the voltage $V_{stor}$ across the storage capacitor $C_{stor}$ decreasing to a lower threshold $V_L$, energy transfer from the storage capacitor $C_{stor}$ to the processing circuitry 34, 36 may be disabled, and as a result of the voltage $V_{stor}$ increasing to an upper threshold $V_H$, energy transfer from the storage capacitor $C_{stor}$ to the processing circuitry 34, 36 may be enabled.

Figure 4:
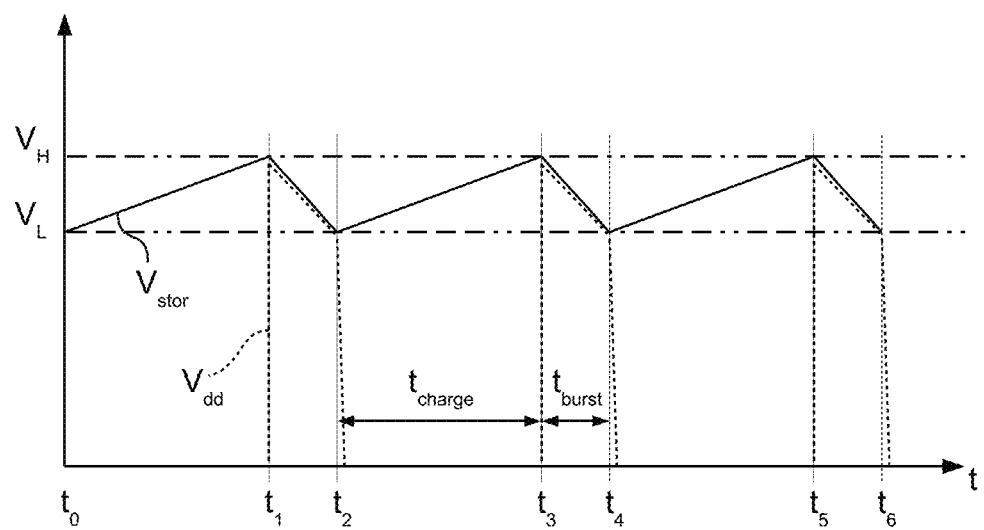
FIG. 4 is exemplary of possible time behavior of signals in one or more embodiments.

Therefore, the voltages $V_{stor}$ and $V_{dd}$ in a device 3 as exemplified herein may have a time behavior as exemplified in FIG. 4, wherein voltage $V_{stor}$ is illustrated with a solid line and voltage $V_{dd}$ is illustrated with a dotted line.

At time $t_0$, with voltage $V_{stor}$ being as low as the lower threshold $V_L$, energy transfer through the power management circuit 32 may be disabled and the output voltage $V_{dd}$ of the power management circuit 32 may be equal to zero. In case the energy harvester 1 is subject to vibrations, energy may be harvested and stored in the storage capacitor $C_{stor}$ through the rectifying circuitry 30, thereby resulting in the voltage $V_{stor}$ increasing.

As a result of voltage $V_{stor}$ reaching the upper threshold $V_H$ at time $t_1$, energy transfer through the power management circuit 32 may be enabled, with $V_{dd}$ being equal to $V_{stor}$ and decreasing over time due to the power required for operation of the processing circuitry (PC) 34, 36, until the lower threshold $V_L$ is reached again, at time $t_2$.

In particular, the processing circuitry may comprise a microcontroller 34 and a sensor circuit 36, with the sensor circuit 36 being configured to:
measure a time interval $t_{burst}$ elapsing between an enablement and a (for example, subsequent) disablement of the energy transfer from the storage capacitor $C_{stor}$ to the processing circuitry 34, 36, and
generate an output signal indicative of a motion parameter (for example, an amount of motion or an amount of vibrations) of the movable body 12 in the energy harvester 1 as a function of the measured time interval $t_{burst}$.

Therefore, a device 3 as exemplified in FIG. 3 may provide the possibility of performing measurement of the amount of vibrations in the environment where the energy harvester 1 is placed, exploiting at the same time the vibrational energy as a source of energy for operation of the device itself.

As exemplified herein, an energy harvester (for example, 1) may comprise:
- an elongated tubular casing (for example, 10) extending around a longitudinal axis (for example, X10) between opposed first (for example, 10A) and second (for example, 10B) ends of the casing,
- at least one body (for example, 12; 12A, 12B) arranged in the casing, and
- at least one helical electrical winding (for example, 14) wound around the longitudinal axis of the casing.

As exemplified herein, the at least one body may be arranged in the casing movable of alternate motion away from the first end towards the second end and away from the second end towards the first end along the longitudinal axis of the casing to produce an electromotive force in the at least one helical electrical winding as a result of said alternate motion, and at least one of the opposed first and second ends of the casing may comprise a piezoelectric transducer (for example, 16A, 16B) configured to co-operate in a kinetic energy transfer relationship with the at least one body as a result of the at least one body reaching in said alternate motion an end-of-travel position towards the piezoelectric transducer, wherein an electric voltage is produced at the piezoelectric transducer.

As exemplified herein, each one of the opposed first and second ends of the casing may comprise a respective piezoelectric transducer configured to co-operate in a kinetic energy transfer relationship with the at least one body as a result of the at least one body reaching in said alternate motion an end-of-travel position towards the first end resp. the second end of the casing, wherein an electric voltage is produced at said respective piezoelectric transducers.

As exemplified herein, an energy harvester may comprise a guide structure (for example, 18) along the longitudinal axis of the casing, and the at least one body may be slidably coupled to the guide structure to facilitate alternate motion away from the first end towards the second end and away from the second end towards the first end along the longitudinal axis of the casing.

As exemplified herein, an energy harvester may comprise bumper formations (for example, 120A, 120B) protruding from the first and second ends of the casing and configured to be impacted against by the at least one body as a result of the at least one body reaching end-of-travel positions in said alternate motion.

As exemplified herein, the at least one body arranged in the casing may comprise a magnet, preferably a magnet having a magnetic polarization parallel to the longitudinal axis of the casing.

As exemplified herein, first (for example, 122A) and second (for example, 122B) further magnets may be provided arranged at the first and second ends of the casing, respectively, said first and second further magnets having magnetic polarizations opposed to the magnetic polarization of said magnet to counter impact of the at least one body against the bumper formations.

As exemplified herein, the at least one helical electrical winding may be wound onto the elongated tubular casing. For instance, the electrical winding may be wound around the external surface of the casing, or at an internal surface of the casing.

As exemplified herein, the at least one helical electrical winding wound around the longitudinal axis of the casing may comprise a helical spring of electrically-conductive material arranged in the casing between the first end and the second end of the casing, and the at least one body may be mechanically coupled to the helical spring, so that alternate motion of the at least one body along the longitudinal axis of the casing results in motion of at least one turn of the helical spring along the longitudinal axis to produce an electromotive force in the at least one helical spring.

As exemplified herein, the casing may comprise magnetic material for generating a magnetic field within the casing, preferably a non-uniform magnetic field.

As exemplified herein, an energy harvester may comprise a plurality of said bodies mechanically coupled to the helical spring, so that alternate motion of said plurality of bodies away from the first end towards the second end and away from the second end towards the first end along the longitudinal axis of the casing results in motion of respective turns of the helical spring along the longitudinal axis to produce an electromotive force in the helical spring.

As exemplified herein, a device (for example, 3) may comprise:
- an energy harvester according to one or more embodiments, and
- a rectifier circuit (for example, 30) coupled to the at least one helical electrical winding and to the at least one piezoelectric transducer in the energy harvester, the rectifier circuit configured for rectifying a voltage generated by the at least one electrical winding and a voltage generated by the at least one piezoelectric transducer, thereby providing an output rectified voltage (for example, $V_{stor}$) to an energy storage component (for example, $C_{stor}$) for storing electrical energy therein, for instance a storage capacitor.

As exemplified herein, a device may comprise a power management circuit (for example, 32) configured to sense a voltage across the energy storage component and to supply energy from the energy storage component to processing circuitry (for example, 34, 36) coupled at the output of the power management circuit, wherein the power management circuit (32) is configured to:
- enable energy transfer from the energy storage component to the processing circuitry as a result of the voltage across the energy storage component increasing to an upper threshold (for example, $V_H$), and
- disable energy transfer from the energy storage component to the processing circuitry after a time interval (for example, $t_{burst}$) from said energy transfer being enabled.

As exemplified herein, the power management circuit may be configured to disable energy transfer from the energy storage component to the processing circuitry as a result of the voltage across the energy storage component decreasing to a lower threshold (for example, $V_L$).

As exemplified herein, the processing circuitry may comprise a sensor circuit (for example, 36) configured to:
- measure the time interval elapsing between an enablement and a subsequent disablement of the energy transfer from the energy storage component to the processing circuitry, and
- generate an output signal indicative of a motion parameter, for example an amount of vibrations, of said at least one body in the energy harvester as a function of the measured time interval.

Without prejudice to the underlying principles, the details and embodiments may vary, even significantly, with respect to what has been described by way of example only, without departing from the extent of protection.

The extent of protection is defined by the annexed claims.

The claims are an integral part of the technical teaching provided herein in respect of the embodiments.

The invention claimed is:

1. An energy harvester, comprising:
an elongated tubular casing extending around a longitudinal axis between opposed first and second ends;
at least one body arranged in the elongated tubular casing; and
at least one helical electrical winding wound around the longitudinal axis of the elongated tubular casing;
wherein the at least one body is movable along the longitudinal axis with an alternate motion away from the first end towards the second end and away from the second end towards the first end to produce a first electrical signal due to an electromotive force in the at least one helical electrical winding as a result of said alternate motion;
wherein at least one of the opposed first and second ends of the casing comprises a piezoelectric transducer configured to co-operate in a kinetic energy transfer relationship with the at least one body as a result of the at least one body reaching in said alternate motion an end-of-travel position towards the piezoelectric transducer so as to produce a second electrical signal; and
a rectifier circuit coupled to receive the first electrical signal from the at least one helical electrical winding and receive the second electrical signal from the at least one piezoelectric transducer, the rectifier circuit configured for rectifying a voltage of the first electrical signal and a voltage of the second electrical signal to provide an output rectified voltage.

2. The energy harvester of claim 1, wherein the first and second ends of the elongated tubular casing each comprise a respective piezoelectric transducer configured to produce said second electrical signal.

3. The energy harvester of claim 1, further comprising a guide structure extending along said longitudinal axis, wherein the at least one body is slidably coupled to the guide structure to facilitate said alternate motion.

4. The energy harvester of claim 1, further comprising a bumper formation protruding from each of the first and second ends and configured to be impacted against by the at least one body as a result of the at least one body reaching end-of-travel positions in said alternate motion.

5. The energy harvester of claim 1, wherein the at least one body arranged in the elongated tubular casing comprises a magnet having a magnetic polarization parallel to the longitudinal axis of the casing.

6. The energy harvester of claim 5, further comprising first and second magnets provided, respectively, at the first and second ends of the elongated tubular casing, said first and second further magnets having magnetic polarizations opposed to the magnetic polarization of said magnet to counter impact of said at least one body against the first and second ends.

7. The energy harvester of claim 1, wherein the at least one helical electrical winding is wound onto an outer surface of the elongated tubular casing.

8. The energy harvester of claim 1, wherein the at least one helical electrical winding is wound within an open space defined by the elongated tubular casing.

9. The energy harvester of claim 1, wherein:
the at least one helical electrical winding wound around the longitudinal axis of the elongated tubular casing comprises a helical spring of electrically-conductive material arranged in the elongated tubular casing between the first end and the second end of the elongated tubular casing; and
the at least one body is mechanically coupled to said helical spring, wherein said alternate motion of said at least one body away from the first end towards the second end and away from the second end towards the first end along the longitudinal axis of the elongated tubular casing results in motion of at least one turn of said helical spring along said longitudinal axis to produce an electromotive force in the at least one helical spring.

10. The energy harvester of claim 9, wherein the elongated tubular casing comprises magnetic material for generating a non-uniform magnetic field within the elongated tubular casing.

11. The energy harvester of claim 9, wherein said at least one body comprises a plurality of bodies, and wherein said plurality of bodies are mechanically coupled to said helical spring, wherein said alternate motion of said plurality of bodies away from the first end towards the second end and away from the second end towards the first end along the longitudinal axis of the elongated tubular casing results in motion of respective turns of said helical spring along said longitudinal axis to produce said electromotive force in the helical spring.

12. The energy harvester of claim 1, further comprising an energy storage component configured to store electrical energy from said output rectified voltage.

13. The energy harvester of claim 12, comprising:
a power management circuit configured to sense a voltage across the energy storage component and to supply energy from the energy storage component to a load circuit.

14. The energy harvester of claim 13, wherein the load circuit comprises a processing circuit.

15. The energy harvester of claim 13, wherein the power management circuit is configured to:
enable energy transfer from the energy storage component to the load circuit as a result of said voltage across the energy storage component increasing to an upper threshold, and
disable energy transfer from the energy storage component to the load circuit after a time interval from said energy transfer being enabled.

16. The energy harvester of claim 13, wherein the power management circuit is configured to disable energy transfer from the energy storage component to the load circuit as a result of said voltage across the energy storage component decreasing to a lower threshold.

17. The energy harvester of claim 13, wherein the load circuit comprises a sensor circuit configured to:
measure a time interval elapsing between an enablement and a subsequent disablement of the energy transfer from the energy storage component to the load circuit, and
generate an output signal indicative of a motion parameter of said at least one body in the energy harvester as a function of said measured time interval.

18. An energy harvester, comprising:
an elongated tubular casing extending around a longitudinal axis between opposed first and second ends;
at least one body arranged in the elongated tubular casing; and
at least one helical electrical winding wound around the longitudinal axis of the elongated tubular casing;
wherein the at least one helical electrical winding comprises a helical spring of electrically-conductive material arranged in the elongated tubular casing between the first end and the second end of the elongated tubular casing;

wherein the at least one body is mechanically coupled to said helical spring and movable along the longitudinal axis of the elongated tubular casing with an alternate motion away from the first end towards the second end and away from the second end towards the first end;

wherein said alternate motion of said at least one body results in motion of at least one turn of said helical spring along said longitudinal axis to produce a first electrical signal due to an electromotive force in the helical spring; and wherein at least one of the opposed first and second ends of the casing comprises a piezoelectric transducer configured to co-operate in a kinetic energy transfer relationship with the at least one body as a result of the at least one body reaching in said alternate motion an end-of-travel position towards the piezoelectric transducer so as to produce a second electrical signal.

19. The energy harvester of claim 18, wherein the elongated tubular casing comprises magnetic material for generating a non-uniform magnetic field within the elongated tubular casing.

20. The energy harvester of claim 18, wherein said at least one body comprises a plurality of bodies, and wherein said plurality of bodies are mechanically coupled to said helical spring, wherein said alternate motion of said plurality of bodies away from the first end towards the second end and away from the second end towards the first end along the longitudinal axis of the elongated tubular casing results in motion of respective turns of said helical spring along said longitudinal axis to produce said electromotive force in the helical spring.

21. The energy harvester of claim 18, wherein the first and second ends of the elongated tubular casing each comprise a respective piezoelectric transducer configured to produce said second electrical signal.

22. The energy harvester of claim 18, further comprising: a rectifier circuit coupled to receive the first electrical signal from the at least one helical electrical winding and receive the second electrical signal from the at least one piezoelectric transducer, the rectifier circuit configured for rectifying a voltage of the first electrical signal and a voltage of the second electrical signal to provide an output rectified voltage.

23. The energy harvester of claim 22, further comprising an energy storage component configured to store electrical energy from said output rectified voltage.

24. The energy harvester of claim 23, comprising:
a power management circuit configured to sense a voltage across the energy storage component and to supply energy from the energy storage component to a load circuit.

25. The energy harvester of claim 24, wherein the load circuit comprises a processing circuit.

26. The energy harvester of claim 24, wherein the power management circuit is configured to:
enable energy transfer from the energy storage component to the load circuit as a result of said voltage across the energy storage component increasing to an upper threshold, and
disable energy transfer from the energy storage component to the load circuit after a time interval from said energy transfer being enabled.

27. The energy harvester of claim 24, wherein the power management circuit is configured to disable energy transfer from the energy storage component to the load circuit as a result of said voltage across the energy storage component decreasing to a lower threshold.

28. The energy harvester of claim 24, wherein the load circuit comprises a sensor circuit configured to:
measure a time interval elapsing between an enablement and a subsequent disablement of the energy transfer from the energy storage component to the load circuit, and
generate an output signal indicative of a motion parameter of said at least one body in the energy harvester as a function of said measured time interval.

\* \* \* \* \*